(12) United States Patent  (10) Patent No.: US 7,477,665 B2
Liu  (45) Date of Patent: Jan. 13, 2009

(54) ELECTRONICALLY TUNED SELF-STARTING POLARIZATION SHAPING MODE LOCKED FIBER LASER

(75) Inventor: Jian Liu, Sunnyvale, CA (US)

(73) Assignee: PolarOnyx., Inc., Sunnyvale, CA (US)

( * ) Notice: Subject to any disclaimer, the term of this patent is extended or adjusted under 35 U.S.C. 154(b) by 177 days.

(21) Appl. No.: 11/351,994

(22) Filed: Feb. 9, 2006

(65) Prior Publication Data

US 2006/0182153 A1 Aug. 17, 2006

Related U.S. Application Data

(63) Continuation-in-part of application No. 11/136,040, filed on May 23, 2005, and a continuation-in-part of application No. 11/093,519, filed on Mar. 29, 2005.

(60) Provisional application No. 60/653,102, filed on Feb. 16, 2005.

(51) Int. Cl.
*H01S 3/30* (2006.01)
*H01S 3/10* (2006.01)

(52) U.S. Cl. .................. 372/6; 372/22; 372/27
(58) Field of Classification Search .............. 372/6, 372/22, 21
See application file for complete search history.

(56) References Cited

U.S. PATENT DOCUMENTS

| 6,130,766 A * | 10/2000 | Cao ......................... 398/147 |
| H1926 H * | 12/2000 | Carruthers et al. ............ 372/6 |
| 6,778,565 B2 * | 8/2004 | Spuehler et al. ............... 372/25 |
| 6,782,146 B2 * | 8/2004 | Hellman et al. ............... 385/11 |
| 2003/0156605 A1 * | 8/2003 | Richardson et al. .......... 372/25 |

* cited by examiner

*Primary Examiner*—Minsun Harvey
*Assistant Examiner*—Patrick Stafford
(74) *Attorney, Agent, or Firm*—Xin Wen (57) ABSTRACT

A fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening/compression in the fiber laser cavity for generating an output laser with a transform-limited pulse shape. The fiber laser cavity further includes a polarization controller controlled and driven by an electronically tunable driver tapping a small portion of an output laser of the fiber laser cavity to process and filtering the small portion of the output laser to drive the polarization controller to adjust a polarization state of a laser transmission in the laser system whereby the laser cavity is an electronically-tuned self-starting polarization-shaping mode-locked fiber laser.

39 Claims, 7 Drawing Sheets

ELECTRONICALLY TUNED SELF-STARTING POLARIZATION SHAPING MODE LOCKED FIBER LASER

This Formal Application claims a Priority Date of Feb. 16, 2005 benefited from a Provisional Patent Applications 60/653,102 filed by the same Applicant of this Application. This Application is further a Continuation in Part (CIP) Application of a previously filed patent application Ser. Nos. 11/093,519 filed on Mar. 29, 2005 and 11/136,040 filed on May 23, 2005 by the same Inventor of this Application. The disclosures made in the application Ser. Nos. 11/093,519 and 11/136,040 are hereby incorporated by reference in this Patent Application.

FIELD OF THE INVENTION

The present invention relates generally to apparatuses and methods for providing short-pulsed mode-locked fiber laser. More particularly, this invention relates to new configurations and methods for providing a self-started polarization-shaping mode locked fiber lasers.

BACKGROUND OF THE INVENTION

Conventional technologies of generating short pulse mode-locked fiber laser are still confronted with technical difficulties and limitations. The pulse shapes of the short-pulse laser cannot be properly and conveniently controlled. The difficulty is even more pronounced when the pulse width is further reduced. Due to this difficulty in pulse shape control, conventional technologies are not able to provide an automatic controller to self-start a fiber laser system with an automatic polarization-shaping mode locked option. There is an urgent demand to resolve these technical difficulties as the broader ranges of applications and usefulness of the short pulse mode-locked are demonstrated for measurement of ultra-fast phenomena, micro machining, and biomedical applications.

An active pulse shaping mode locked fiber laser was disclosed by J. D. Kafka, T. Baer, and D. W. Hall in a paper entitled "Mode locked erbium doped fiber laser with soliton pulse shaping," Opt. Lett. 22, 1269-1271 (1989). Different from the active pulse shaping mode locked fiber laser, intensity dependent polarization rotation or nonlinear polarization evaluation (NPE) has been identified as a fast response saturation absorber (SA) to achieve short pulse fiber laser as presented by C. J. Chen, P. K. Wai, in "Soliton fiber ring laser," Opt. Lett. 17, 417-419 (1992). However, D. U. Noske, N. Pandit, J. R. Taylor and K. Tamura, H. A. Haus, and E. I. Ippen have showed by their experimental results that longer pulse widths and come with unwanted sidebands that degraded the performance of the soliton fiber lasers. More details can be referred to D. U. Noske, N. Pandit, J. R. Taylor, "Subpico-second soliton pulse formation from self mode locked erbium fiber laser using intensity dependent polarization rotation," Electronics Letters 28, 2185 (1992) and K. Tamura, H. A. Haus, and E. I. Ippen, "Self starting additive pulse mode locked erbium fiber ring laser," Electonics Letters 28, 2226 (1992). To further reduce the pulse width, stretched pulse fiber laser were proposed using short length of fiber cavity and operating at positive dispersion region. A 77 fs pulse fiber laser has been demonstrated. These demonstrations were discussed in K. Tamura, et al., "77 fs pulse generation from a stretched pulse mode locked all fiber ring laser," Opt. Lett. 18, 1080 (1993) and Tamura, et al., Stretched pulse fiber laser, U.S. Pat. No. 5,513,194, 1996. However, they have not achieved transform-limitedly shaped pulse, because the spectrum is not symmetrically Gaussian/Soliton shape and time bandwidth product (TBP) is too large. It is still remained a challenge to obtain transform limited pulse.

Figure 1:
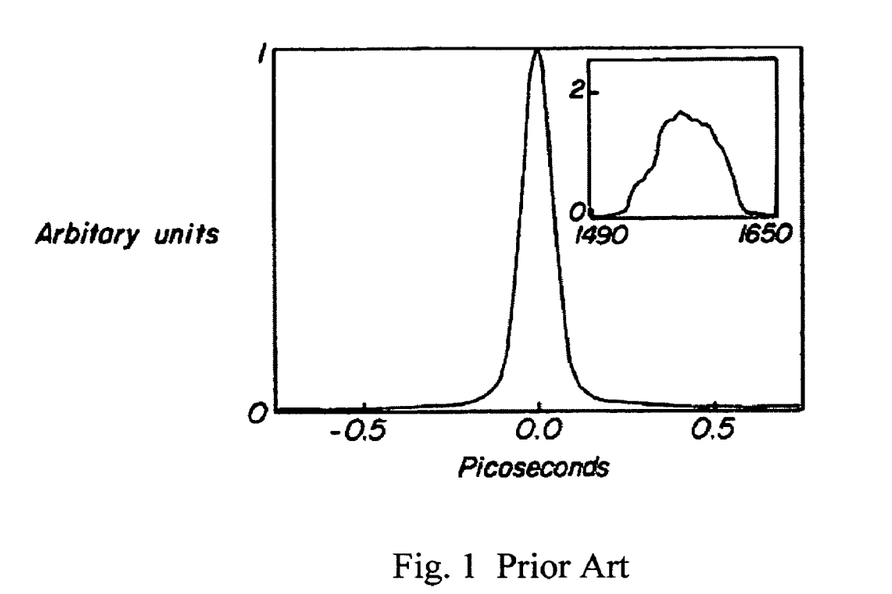
FIG. 1 shows the pulse shape generated by a prior art invention.

More specifically, in U.S. Pat. No. 5,513,194 Tamura et al. disclosed a fiber laser for producing high-energy ultra-short laser pulses, having a positive dispersion fiber segment and a negative-dispersion fiber segment joined in series with the positive-dispersion fiber segment to form a laser cavity. With this configuration, soliton effects of laser pulse circulation in the cavity are suppressed and widths of laser pulses circulating in the cavity undergo large variations between a maximum laser pulse width and a minimum laser pulse width during one round trip through the cavity. The fiber laser also provides means for mode-locking laser radiation in the laser cavity, means for providing laser radiation gain in the laser cavity, and means for extracting laser pulses from the laser cavity. Using selected positive- and negative-dispersion fiber segments, the laser cavity exhibits a net positive group velocity dispersion, and the ratio of the maximum laser pulse width to the minimum laser pulse width attained during one round trip through the cavity is greater than 5, and preferably greater than 10. The laser cavity may be configured with different cavity geometries and preferably the ring cavity to achieve unidirectional circulation of laser pulses to produce laser pulses having a pulse width of less than 100 fs and a pulse-energy of at least 80 pJ. However, as that shown in FIG. 1, the waveform of the short pulse laser still present distorted pulses and the laser so generated is not a transform-limited shape and still have limited applications in telecommunications since such laser pulse is not able to overcome the problems of the non-linearity and dispersion effects of the laser pulses during the transmission. The distorted pulse shapes are caused by the unbalanced dispersion and the non-linearity of control for operating the laser at the positive net dispersion region. For these reasons, the laser disclosed by Tamura et al. cannot achieve a higher laser transmission efficiency of the transformed-limited shape.

Therefore, a need still exists in the art of fiber laser design and manufacture to provide a new and improved configuration and method to provide short pulse mode-locked fiber laser with better controllable pulse shapes such that the above discussed difficulty may be resolved. Furthermore, in order to provide reliably controllable fiber laser system that can be conveniently tuned and operated, it is further desirable to provide f electronically tunable fiber laser systems. Additionally, it is further desirable that the electronically tunable system can be self-starting with polarization shaping and mode-locked operational functions such that time savings can be achieved in starting and operating the laser system.

SUMMARY OF THE PRESENT INVENTION

It is therefore an aspect of the present invention to provide a method of using nonlinear polarization evolution (NPE) and dispersion managed fiber cavity to manipulate the pulse propagation in the cavity and balance the self phase modulation (SPM) and dispersion induced pulse broadening/compressing. This method of polarization pulse shaping generates transform-limited pulse shapes through combinational effects of fiber length, the non-linear effects and dispersion such that the above-described difficulties encountered in the prior art can be resolved.

This invention further provides a method to self-start a polarization shaping mode locked fiber laser by electronically tuning a polarization controller. The in line electronically driven polarization controllers may be alternately implemented with either a liquid crystal (LC) based, squeezed fiber based, or any other types. These polarization controllers as implemented and the optical components included in the fiber laser systems of this invention can be in line type or free space types.

Specifically, it is an aspect of this invention to provide a new short-pulse mode-locked fiber laser with a ring structure that includes a 980/1550 WDM (wavelength division multiplexing) coupler for introducing a laser projection to a gain medium to amplify the pulse for transmitting in a cavity that includes fiber segments of positive and negative dispersions. The laser transmission then passes through a polarization sensitive isolator controlled by polarization controller to carry out a pulse shaping for generating extra-short pulse of laser conforming to the transform-limited pulse shapes. It is a further aspect of this invention that the polarization controller is connected to an electronically tunable driver to provide a self-starting polarization shaping mode locked fiber laser system.

Briefly, in a preferred embodiment, the present invention discloses a fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening/compression in the fiber laser cavity for generating an output laser with a transform-limited pulse shape. The fiber laser cavity further includes a polarization sensitive isolator and a polarization controller for further shaping the output laser. The polarization controller further controlled and driven by an electronically tunable self-starting pulse shaping driver tapping a small portion of an output laser of the fiber laser cavity to process and filtering the small portion of the output laser to drive the polarization controller. In a preferred embodiment, the gain medium includes an erbium doped fiber constitutes a positive dispersion fiber segment. In a preferred embodiment, the laser cavity is a ring cavity. The laser cavity further includes an output coupler for transmitting a portion of a laser as the output laser from the fiber laser cavity. In another preferred embodiment, the laser cavity further includes a single mode fiber constituting a fiber segment of a negative dispersion connected to the gain medium. In a preferred embodiment, the gain medium further includes a Ytterbium doped fiber for amplifying and compacting a laser pulse.

In a preferred embodiment, this invention further discloses a method for method for generating a pulse-shaped transform-limited output laser from a laser cavity that includes a laser gain medium. The method includes a step of forming the laser cavity by employing a positive dispersion fiber segment and a negative dispersion fiber segment for generating a net negative dispersion. The method further includes a step of projecting an input laser from a laser pump into said fiber laser cavity for balancing a dispersion induced nonlinearity with a self-phase modulation (SPM) in said fiber laser cavity for generating an output laser with a transform-limited pulse shape. The method further includes a step of electronically tuning a polarization of a laser transmission in the laser cavity by tapping a small portion of the output laser for processing, filtering and driving a polarization controller for enabling a self-starting polarization shaping and mode locking process.

In another preferred embodiment, this invention further discloses a fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening/compression in the fiber laser cavity for generating an output laser with a transform-limited pulse shape. The fiber laser cavity further includes a polarized insensitive isolator for receiving a collimated beam from a collimator coupled to a polarization controller for projecting an isolated beam to a beam splitter for generating a polarized transform-limited output laser. The fiber laser cavity further includes a polarization controller controlled and driven by an electronically tunable self-starting pulse shaping driver tapping a small portion of an output laser of the fiber laser cavity to process and filtering the small portion of the output laser to drive the polarization controller.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 2:
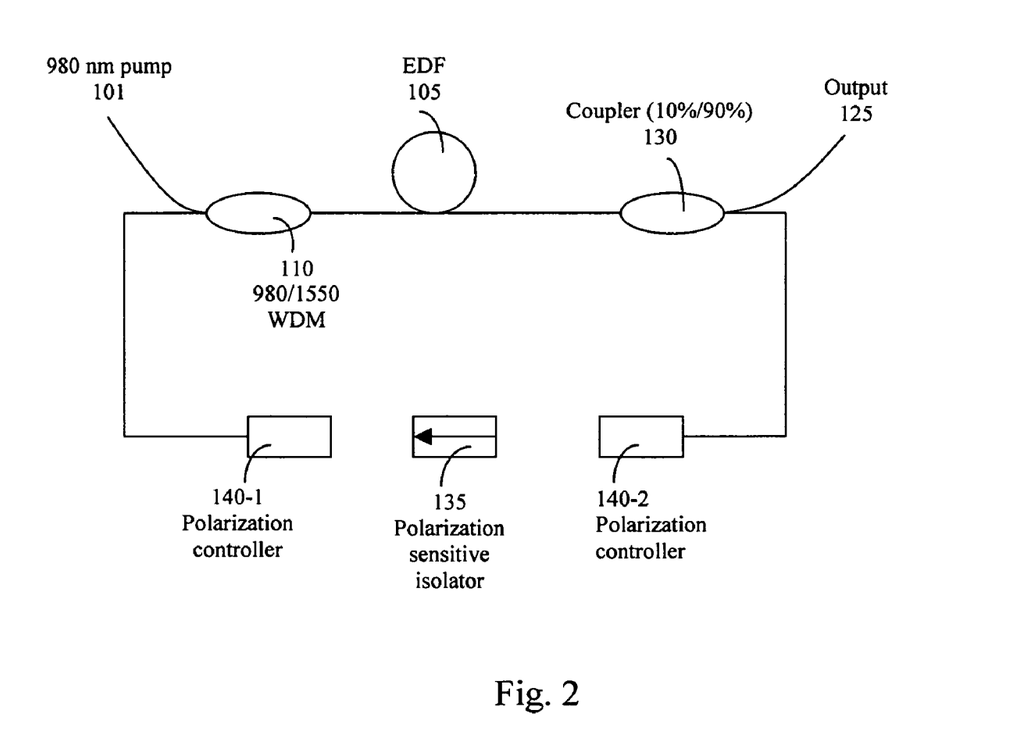
FIG. 2 is functional block diagram for a short-pulse mode-locked fiber laser of this invention.

Referring to FIG. 2 for a schematic diagram of a nonlinear polarization pulse-shaping mode locked fiber laser 100 of this invention. The fiber laser is a ring structure laser that includes a gain medium (EDF) 105, a polarization sensitive isolator 135, polarization controllers 140-1 and 140-2, a 980/1550 WDM coupler 110, and an output coupler 130. Alternately, the gain medium 105 may also be implemented with a Yatterbium (Yb) doped fiber (YDF). One meter of Erbium doped fiber (EDF) 105 was used in the fiber laser as a gain medium and is used to amplify and compress the pulse width. The fiber has a high doping concentration (80 dB/m at 1530 nm) with a dispersion of −55 ps/nm/km. A 980 nm high power pump laser diode 101 coupled through a wavelength division multiplexer 110 is used to pump the EDF 105 to amplify the pulses circulating in the cavity. The rest of the cavity comprising a single mode (SM) fiber (17 ps/nm/km) 115 having a length about three meters and an HI 1060 fiber 120 commercially provided by Corning as standard fiber with dispersion 14 ps/nm/km at 1550 nm having a length of about 0.5 meter. The output fiber pigtail 125 includes a single mode (SM) fiber having a length of about one meter. A coupler 130, e.g., a 10%/90% coupler, is coupled between the single mode (SM) fiber 115 and the output fiber to transmit a portion of the light, e.g., 90% of the light, out of the cavity. The coupling ratio can also be adjusted to obtain different power levels of output. The gain medium EDF 105 has a normal dispersion fiber ($\beta''>0$) and remainder portions of the fibers are negative dispersion fibers ($\beta''<0$), the whole cavity average dispersion is designed to operate at anomalous dispersion ($\beta''<0$) to achieve a stable transform-limited pulse.

The fiber laser 100 of this invention is different from the conventional laser as that disclosed by C. J. Chen, P. K. Wai, in "Soliton fiber ring laser," Opt. Lett. 17, 417-419 (1992) and D. U. Noske, N. Pandit, J. R. Taylor, in "Subpicosecond soliton pulse formation from self mode locked erbium fiber laser using intensity dependent polarization rotation," Electronics Letters 28, 2185 (1992). The fiber laser 100 of this invention generates the transform-limited short pulse mode locked fiber laser by a combination of negative and positive dispersion fibers to manage the pulse propagation in the cavity and balance the self phase modulation (SPM) and dispersion to reduce the saturation effects in the amplification region. The erbium-doped fiber (EDF) 105 is a positive dispersion fiber and the remaining portions of the fibers are negative dispersion fibers. The ratio of the positive to the negative dispersions in one of the preferred embodiment is approximately 2 to 5. When the nonlinear length and dispersion length are comparable, e.g., within a ratio of 1-3, the shape of soliton, or other transform-limited pulse, maintains the pulse shape while in propagation through either transmission fiber or gain medium. The nonlinear length, i.e., $Lnl=1/\gamma P$, where P is the peak power of the pulse and $\gamma$ is nonlinear coefficient, and the dispersion length, i.e., $Ld=T^2/|\beta''|$, where T is the pulse width, provides the length scale over which the dispersive effects or nonlinear effects become important for pulse evolution along a fiber segment. When the fiber length is longer or comparable to both the dispersion length Ld and the nonlinear length Lnl, the dispersion and the nonliearity work together for pulse propagation along the fiber.

Figure 3A:
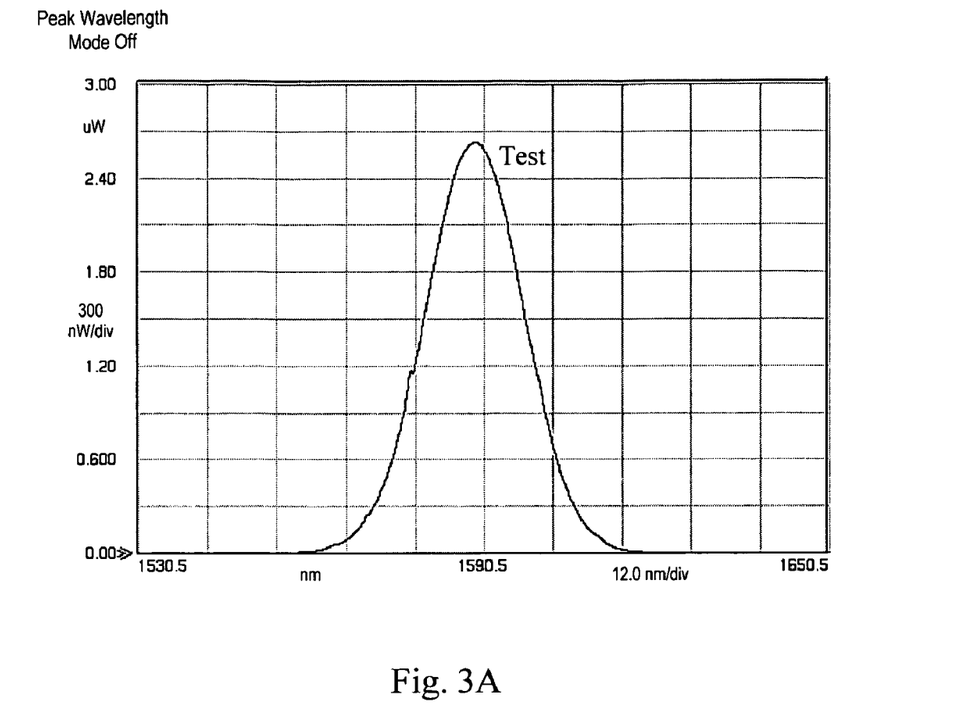
FIG. 3A is a waveform for showing the output spectrum from a mode-locked fiber laser as shown in FIG. 1.
Figure 3B:
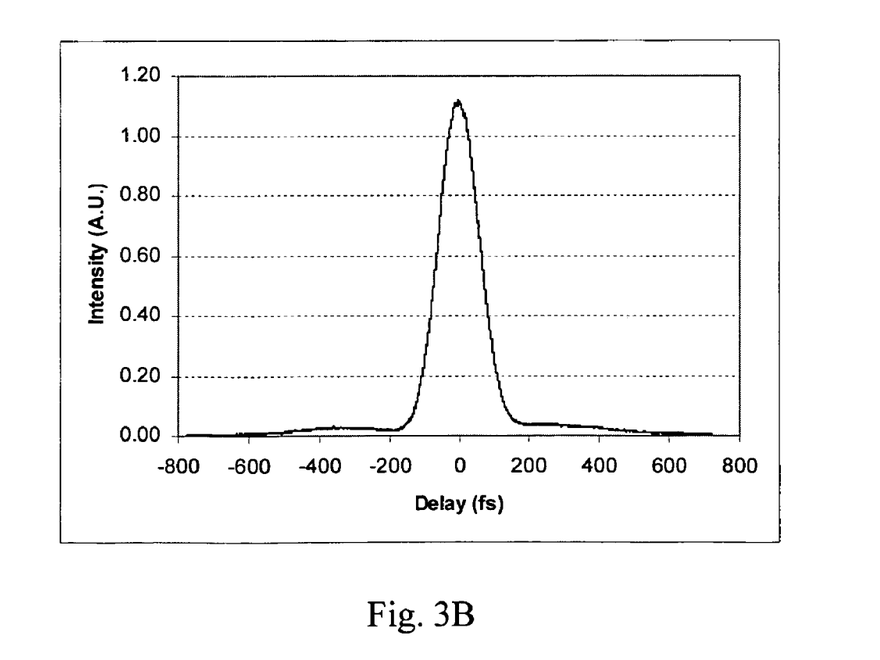
FIG. 3B is a waveform for showing an autocorrelator trace for pulse width measurement (150 fs).
Figure 3C:
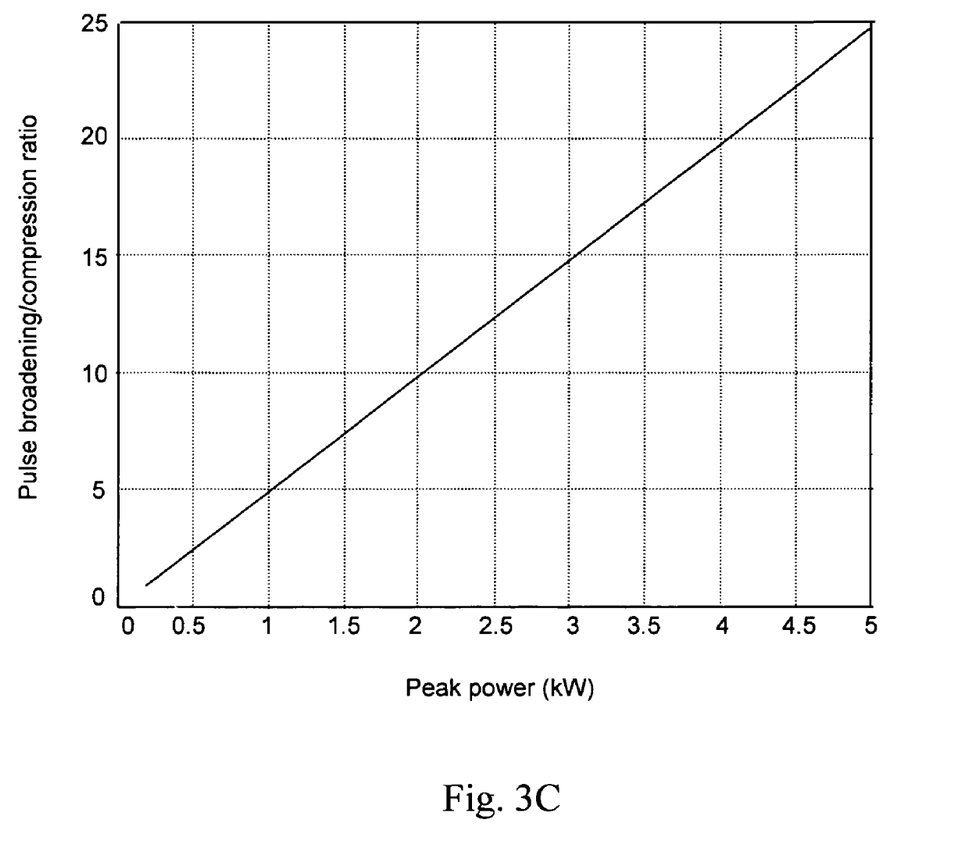
FIG. 3C shows the pulse broadening/compression ratio as function of the peak power for a 1 m fiber with dispersion of 17 ps/nm/km and a pulse width of 200 fs.

Actual implementation of the laser configuration substantially similar to a system shown in FIG. 2 has been performed in the laboratory. Adjustments for tuning the two polarization controllers 140-1 and 140-2 are carried out by adjusting the current to 250 mW to generate pulsed output. The mode locked pulses are self-started when the laser is turned on and can be maintained down to 100 mW. FIG. 3A shows its spectrum in linear scale with a bandwidth of 20 nm. It is very close to a soliton shape. FIG. 3B represents its pulse width measurement by using an autocorrelator (150 fs). The TBP is calculated to be 0.37, indicating a good soliton pulse. The repetition rate is about 50 MHz. Average power can be varied from 1 mW to 5 mW. FIG. 3C shows a computational results of the pulse broadening-/compression ratio as function of the peak power for a 1 m fiber with dispersion of 17 ps/nm/km and a pulse width of 200 fs.

Figure 4A:
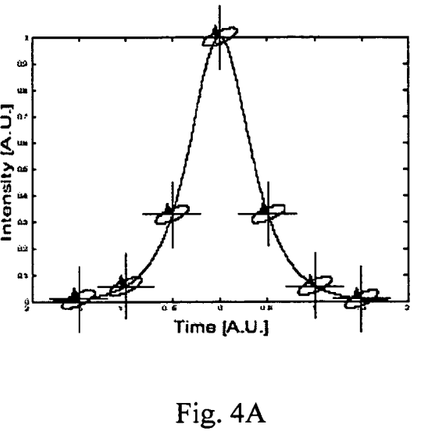
FIGS. 4A and 4B are waveforms for showing polarization changes as laser pulse transmitted over a laser cavity.
Figure 4B:
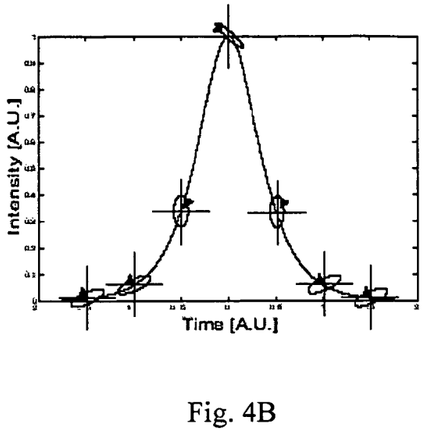

A fiber exhibits a nonlinear birefringence that depends on the local intensities of the two orthogonally polarized field components. As a result, an elliptically polarized pulse will have two orthogonal components, i.e., x and y components. These two components experience different phase shifts, thus rotating the polarization ellipse. Since the phase shift is an intensity-dependent process, it rotates the polarization of a pulse at different amounts depending on the pulse's local intensity. FIGS. 4A and 4B show polarization's physical effect on a pulse. If the nonlinear effects are ignored and let FIG. 4A represent a uniformly polarized pulse launches into an isotropic optical fiber, a uniformly polarized output pulse is obtained as that depicted by FIG. 4B. Therefore, by launching the same pulse into the same fiber implemented with the effects of self phase modulation (SPM) and Cross phase modulation (XPM), an output similar to FIG. 4B can be generated. Examining FIG. 4B, it is noted that the low intensity wings are not affected, yet, as the pulse's intensity increases, a rotation of the polarization ellipse is observed. Therefore, a nonlinear phase evolution (NPE) induced by the nonlinear phase change of self-phase modulation (SPM) causes a polarization rotation, as the polarization is now pulse intensity dependent. Thus, the mode lock mechanism is caused by the SPM induced NPE. When the pulse passes through the polarization sensitive isolator that is controlled and adjusted by a polarization controller, only the highest intensity that lined up with the isolator will pass. The lower intensity part of the pulse is filtered out. Therefore, the pulse is well shaped and thus works as a saturation absorber (SA) to reduce the pulse width. The polarization controller 140 can be fiber based, or bulk optical quarter/half wave retarders, or a combination of both. The "polarization sensitive isolator and polarization controllers" works to select a polarization for the pulses, which have different polarization states in time domain.

When the pulse circulates in the fiber laser cavity, the laser pulse experiences the self-phase modulation (SPM) induced pulse broadening effects in both negative anomalous single mode fibers and positive normal dispersion fiber regions due to a high peak power and short pulse width (<ps). Moreover, in the region of positive dispersion, i.e., $\beta''>0$, in the EDF 105, because the peak power is very high (>200 W for a 200 fs pulse), the nonlinear length and the dispersion length are comparable, i.e., ~1 m, in the EDF 105 segment. The pulse can be compressed by using the effects of both self phase modulation (SPM) and dispersion.

Figure 5:
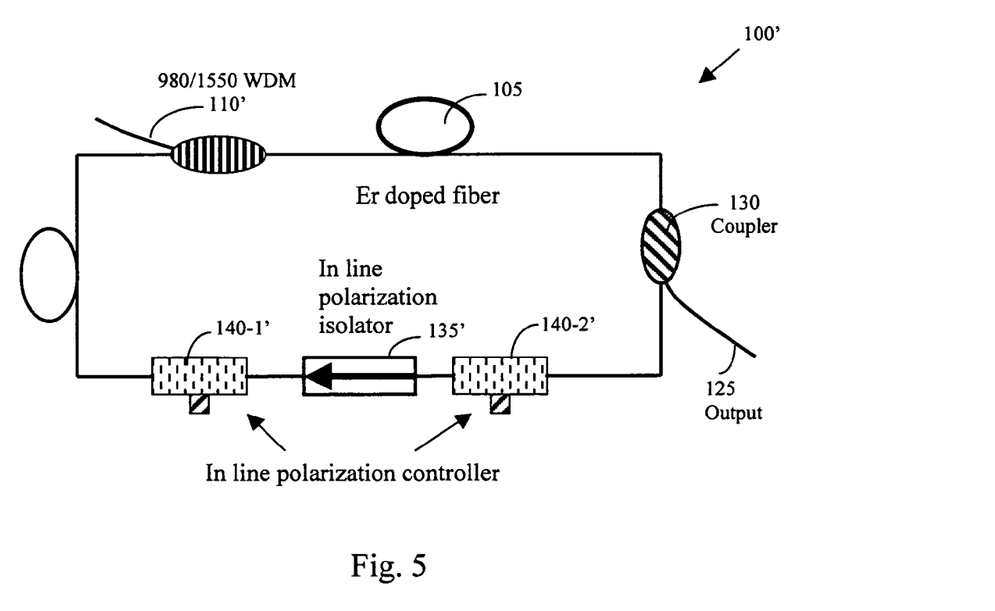
FIG. 5 is a functional block diagram of another preferred embodiment of an all fiber-based short-pulse mode-locked laser of this invention.

Referring to FIG. 5 for a mode-locked fiber laser 100' formed with all fiber-based components. The fiber laser has a ring configuration receiving a laser input through a 980 or 1550 nm WDM 110. The all fiber-based laser 100' similar structure as that shown in FIG. 2 with an erbium doped fiber 105 as a gain medium to amplify and compress the pulse width. The all fiber-based laser 100' employs an in-line polarization controller 140-1' and 140-2' before and after an in-line polarization sensitive isolator 135' that is implemented with single mode (SM) fiber pigtails. The in-line polarization sensitive control may be a product commercially provided by General Photonics, e.g., one of PolaRite family products. Similar to the laser shown in FIG. 2, the gain medium EDF 105 has a normal dispersion fiber ($\beta''>0$) and rest of the fibers are negative dispersion fibers ($\beta''<0$), the whole cavity average dispersion is designed to operate at anomalous dispersion ($\beta''<0$) to achieve a stable transform-limited pulse. All fiber solution as shown provides advantages of compactness and robustness thus more suitable for practical industrial applications.

Figure 6:
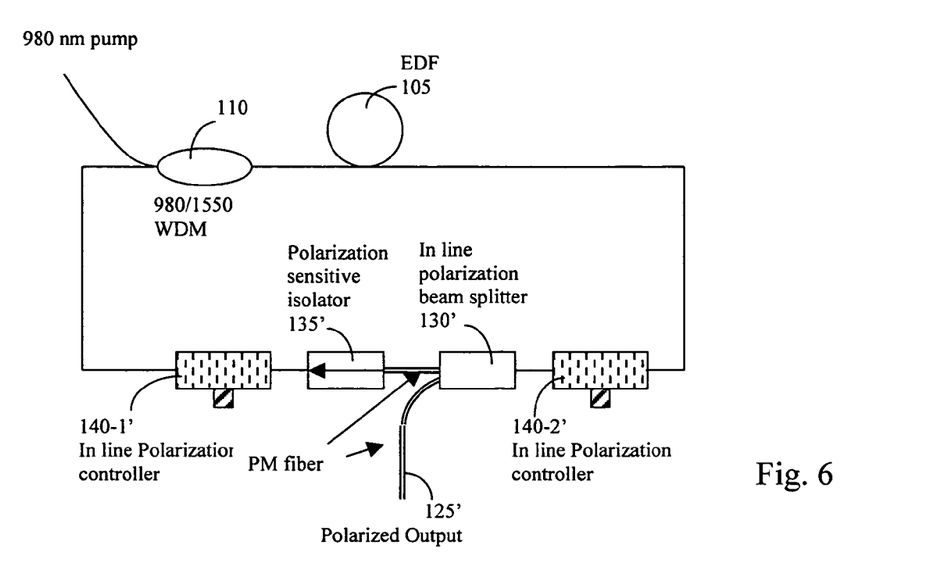
FIG. 6 is a functional block diagram of another preferred embodiment of a nonlinear polarization pulse shaping short-pulse mode-locked laser of this invention.

Referring to FIG. 6 for a preferred embodiment similar to that shown in FIG. 2 to achieve an all fiber solution for mode-locked fiber laser to generate an output polarized laser. Instead of an output coupler 130 as that implemented in FIGS. 2 and 5, an in-line beam splitter 130' is used that has a single mode input fiber with a polarization maintaining (PM) output fiber 125'. The in-line isolator 135 can be either a polarization sensitive or a polarization insensitive isolator. The output from the PM output fiber 125' provides seed pulses for further pulse amplification and second harmonic generation.

Figure 7A:
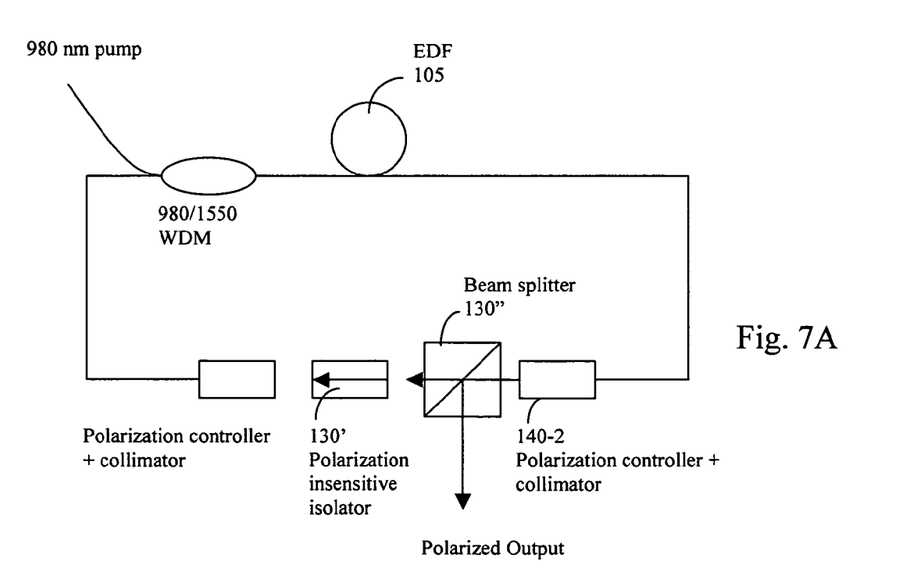
FIG. 7A is a functional block diagram of another preferred embodiment of an alternate nonlinear polarization pulse shaping short-pulse mode-locked laser of this invention.
Figure 7B:
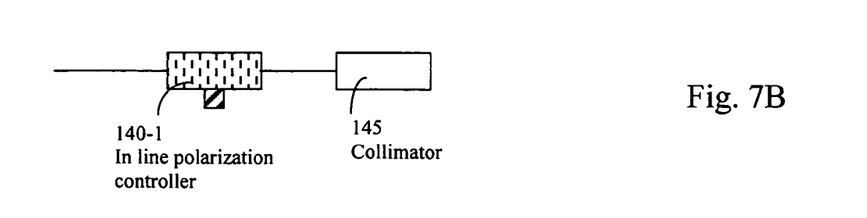
FIG. 7B is a diagram for showing a type of polarization controller with a collimator.

Referring to FIG. 7A for another preferred embodiment similar to that shown in FIG. 2 to generate a polarized output by placing a polarization splitter 130" between the collimators of the polarization controllers 140-1 and 140-2. This embodiment is configured with some free space components. FIG. 7B shows the inline polarization controller 140-1 is connected to a collimator 145 for collimating the light for projecting to the polarization sensitive isolator 135 and the polarization beam splitter 130". This embodiment provides the advantageous features of generating polarized output and application of a fiber-based polarization controller.

Figure 8:
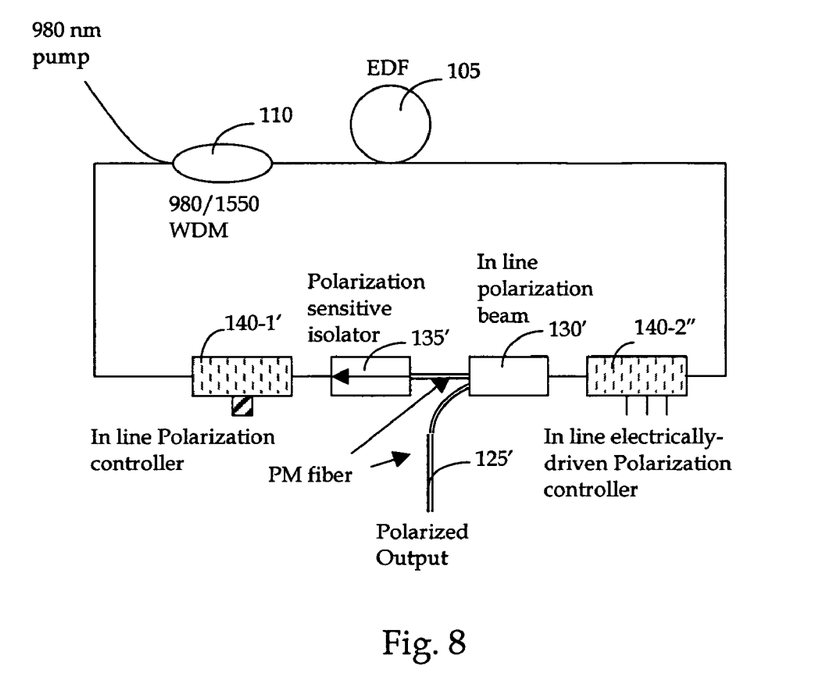
FIGS. 8 and 9 are two fiber systems provided with electronic driving system to enable the fiber laser to achieve electronically tuned self-starting polarization shaping mode locked functions.

FIG. 8 an alternate embodiment of this invention similar to the fiber laser systems as shown in FIG. 2 and FIG. 6 to achieve an all fiber solution for mode-locked fiber laser to generate an output polarized laser. Instead of an output coupler 130 as that implemented in FIGS. 2 and 5, an in-line beam splitter 130' is used that has a single mode input fiber with a polarization maintaining (PM) output fiber 125'. The in-line isolator 135 can be either a polarization sensitive or a polarization insensitive isolator. The output from the PM output fiber 125' provides seed pulses for further pulse amplification and second harmonic generation. The in-line polarization controller 140-2" is now implemented as an electrically driven polarization controller.

Figure 9:
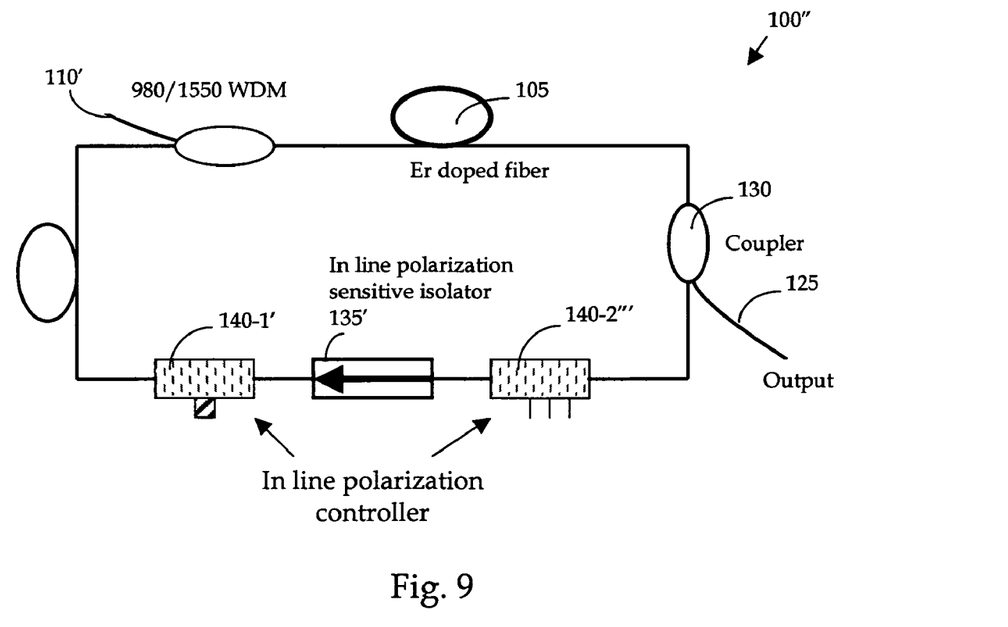
Figure 10:
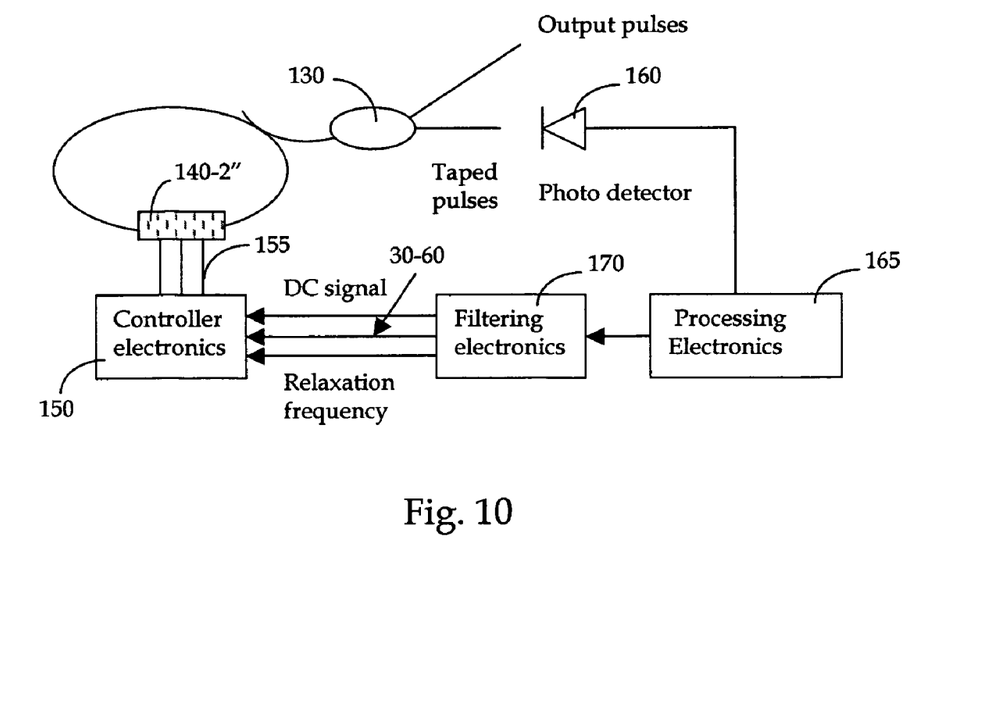
FIG. 10 is a function block diagram for showing the electronic driving system to drive and control the polarization controller of FIGS. 8 and 9.

Referring to FIG. 9 for another mode-locked fiber laser 100" similar in structure and function as the laser fiber system of FIG. 5 formed with all fiber-based components. The fiber laser has a ring configuration receiving a laser input through a 980 or 1550 nm WDM 110. The all fiber-based laser 100" similar structure as that shown in FIG. 2 with an erbium doped fiber 105 as a gain medium to amplify and compress the pulse width. The all fiber-based laser 100' employs an in-line polarization controller 140-1' and 140-2''' before and after an in-line polarization sensitive isolator 135' that is implemented with single mode (SM) fiber pigtails. The in-line polarization sensitive control may be a product commercially provided by General Photonics, e.g., one of PolaRite family products. Similar to the laser shown in FIG. 2, the gain medium EDF 105 has a normal dispersion fiber ($\beta">0$) and rest of the fibers are negative dispersion fibers ($\beta"<0$), the whole cavity average dispersion is designed to operate at anomalous dispersion ($\beta"<0$) to achieve a stable transform-limited pulse. All fiber solution as shown provides advantages of compactness and robustness thus more suitable for practical industrial applications. The polarization controller 140-2''' is driven by an electronic driving system as shown in FIG. 10 below. By connecting the polarization controller 140-2''' to the electronic driving system through connecting pins 155, the fiber laser system 100''' is enabled to achieve an electronically tuned self-starting polarization shaping mode-locked function.

FIG. 10 is a functional block diagram to illustrate the electronic driving system connected from the controller electronics 150 via connector pins 155 to the in-line polarization controller 140-2". In order to automatically start the polarization shaping fiber laser and electronically drive the polarization controller 140-2", a small percentage of signal, e.g., 1% is tapped out from the output coupler 130. A photo detector 160 detects the tapped signal and transmitting the detected signals to a processing electronics 165 and a filtering electronics 170. The processing electronics 160 and the filtering electronics 165 generate DC components of the signals and the 20-100 MHz band components that is the laser repetition rate. The processing electronics 160 and the filtering electronics 165 further use the other signature frequencies such as relaxation frequency. The controller electronics 150 then correlates these components, e.g., the DC, 20-100 MHz, and/or relaxation frequency, with the polarization state controlled by the polarization controller in the cavity, self-start can be achieved electronically. When the polarization controller 140-2" is tuned to mode locking status, a stronger component in 20-100 MHz band is generated.

The processing electronics 160 receives the incoming signals tapped from the output coupler 130 to process the analog signal and converts the signals into frequency dependent components. The filtering electronics 165 has different filtering band electronics that can extract signals in different frequency ranges, e.g., a DC signal, 20-100 MHz signal that correlates to the mode locking operation, and relaxation signal at around ten kHz. The controller electronics 150 adjusts the polarization state based on a control loop algorithm. The polarization state is adjusted by using an adjustment algorithm. The controller electronics 150 applies the adjustment algorithm generated by using the three components from the filtering electronics to achieve a mode locking state. The adjustment algorithm employed by the controller electronics 150 is based on several correlations provided by these signal components. Specifically, the DC signal indicates how the laser operates at the mode locking state in the 20-100 MHz. A stronger DC component indicates a weaker mode locking of the laser system. The 20-100 MHz components are directly correlated to the mode locking status. The stronger the signals of the 20-100 MHz components, the better the laser mode locking performance. The relaxation signal related the stability of this laser operation. It may also use the ratio of them. The controller electronics 150 applies a polarization adjustment algorithm to achieve an ideal operation of mode locking laser system by reducing the DC signal components, increasing the signals of the 20-100 MHz components while stabilizing the relaxation signal.

In starting up the laser system, the laser cavity is generally operating at a continuous mode in the beginning with large DC component and a signal component in the 20-100 MHz range is not detected. While tuning the polarization controller, the signal component at the 20-100 MHz frequency range is gradually increased and the relaxation oscillation is also becoming more stable. The DC component is gradually decreasing. Close to a mode locking condition is achieved. Upon fine-tuning the system, a stable and optimal 20-100 MHz and relaxation signal components are measured while a lowest DC component is maintained. A mode locking state is achieved with the tunable driver controlling the polarization controller as described above. As shown in the drawings above, there are two polarization controllers. There are benefits of controlling and tuning both controllers to further accelerating the progress of the system condition to achieve a mode locking condition. A automatic control loop can be implemented to fully automate the self-starting process to progressively tuning the system to a mode locking condition without human intervention.

Figure 11:
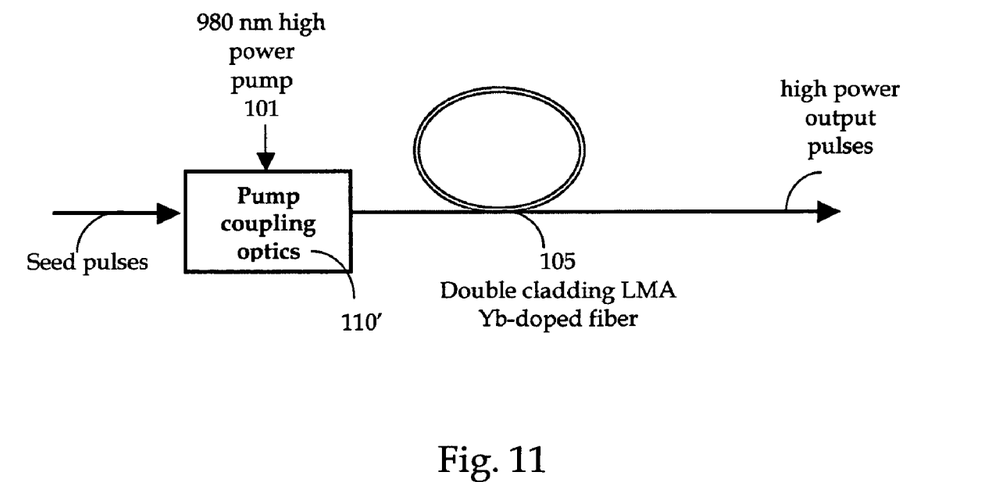
FIG. 11 is functional block diagram for showing a high power amplifier for providing a femtosecond laser pulses.

Similar to the laser shown in FIGS. 8 and 9, the amplification is achieved by using a short piece of high concentration double cladding Yd-doped fiber (DCYDF) with large mode area (LMA) 105 as shown in FIG. 11. The LMA of the DCYDF combined with short length help balance the nonlinear effects such as SPM and XPM with the dispersion so the pulse width will not be broadened after amplification. This DCYDF can be a PC fiber as well in balancing the dispersion and SPM. The laser system as shown in FIGS. 8 and 9 in combination with an the gain medium shown in FIG. 11 has the advantages that it is alignment and maintenance free. It is much easier to handle the all-fiber based fiber laser and amplifiers than conventional mode locked solid state and/or fiber lasers. There are no alignment and realignment issues related. After the fibers and components are spliced together and packaged, there will be no need of specially trained technician for operation and maintenance, which reduce the cost and risk significantly in the field applications. Furthermore, it can be easily integrated with other module, such as telescope/focusing system without extra optical alignment effort due to the flexibility of optical fiber. The laser system further takes advantage of the fully spectrum of the gain of the YDF and provides a high quality laser that is suitable for processing the nano-material. The laser system is implemented with all photonic crystal fibers for both the gain medium and transmission fibers in the cavity to compensate both the dispersions and dispersion slope. The photonic crystal (PC) fiber shows novel properties in manipulating its structures such as hollow lattice shapes and filling factors to obtain both normal and anomalous dispersion below 1300 nm range. The PC fiber is used to compensate both dispersions and slope in the cavity and make short pulsed fiber laser by selecting various PC fibers. Further more, due to one of its unique features of smaller effective area than the regular single mode fibers, stronger nonlinear effects can be caused in the fiber and its impact on SPM can be utilized to achieve shorter cavity by selecting an appropriate PC fiber. On the other hand, by using the feature of air core PC fiber, larger pulse energy can be extracted. As shown in FIG. 11, a high power amplifier YDF 105 is used to boot the seed pulse inputted from a high power pump 101 through a pump coupling optics 110' to an average power up to 10 W with femetosecond ultra-short pulse amplification. This is different from the CW (continuous wave) and nano-second (NS) pulse. Special consideration must be taken into accounts of the effects of SPM, XPM, and FWM. The dispersion has to be carefully selected to make all effects matched and balanced to avoid any pulse broadening and distortion in the non-linear short pulse fiber transmission modes.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A mode-locked fiber laser, comprising:
   an input coupler configured to couple pump light into a laser cavity;
   a fiber-based gain medium configured to amplify signal laser pulses in response to the pump light, wherein the signal laser pulses each has a peak portion having a peak polarization and a wing portion having a wing polarization different from the peak polarization;
   a first fiber-based polarization controller configured to align the peak polarizations of the signal laser pulses along a first polarization direction;
   a polarization isolator configured to receive the signal laser pulses from the first fiber-based polarization controller, and to uni-directionally pass the peak portions of the signal laser pulses having the peak polarizations aligned along the first polarization direction, wherein the polarization isolator is configured to block at least portions of the wing portions in the signal laser pulses;
   a second fiber-based polarization controller configured to control the peak polarization of the peak portions of the signal laser pulses received from the polarization isolator, wherein the polarization isolator is positioned between the first fiber-based polarization controller and the second fiber-based polarization controller, wherein the input coupler, the fiber-based gain medium, the first fiber-based polarization controller, the polarization isolator, and the second fiber-based polarization controller in part define the laser cavity;
   a photo detector configured to produce a detected signal in response to the signal laser pulses;
   a polarization-control driver configured to control at least one of the first fiber-based polarization controller or the second fiber-based polarization controller in response to the detected signal, wherein the polarization-control circuit is configured to produce mode locking in the signal laser pulses at a repetition rate; and
   an output coupler configured to direct portions of the signal laser pulses as output laser pulses out of the laser cavity.

2. The mode-locked fiber laser of claim 1, wherein the polarization-control driver comprises:
   a first circuit configured to produce a DC component and a periodic component at the repetition rate in response to the detected signal; and
   a second circuit configured to correlate the DC component and the periodic component to control at least one of the first fiber-based polarization controller or the second fiber-based polarization controller to produce mode-locking in the signal laser pulses.

3. The mode-locked fiber laser of claim 2, wherein the periodic component has a frequency in a range between 20 MHz to 100 MHz.

4. The mode-locked fiber laser of claim 2, wherein the first circuit is configured to produce a relaxation signal at a frequency in a range between 10 kHz and 500 KHz in response to the signal laser pulses, wherein second circuit is configured to correlate the relaxation signal to produce mode-locking in the signal laser pulses.

5. The mode-locked fiber laser of claim 1, wherein the polarization-control driver is configured to adjust the peak polarizations of the signal laser pulses to produce mode locking in the signal laser pulses.

6. The mode-locked fiber laser of claim 1, wherein the polarization-control driver is configured to control the first fiber-based polarization controller to produce mode locking in the peak portions of the signal laser pulses in the laser cavity.

7. The mode-locked fiber laser of claim 1, wherein the polarization isolator is fabricated with a single-model optical fiber.

8. The mode-locked fiber laser of claim 1, wherein the fiber-based gain medium is a double cladding fiber doped by Ytterbium or Erbium.

9. The mode-locked fiber laser of claim 1, wherein the fiber-based gain medium has a normal dispersion ranging from −10 ps/nm/km to −80 ps/nm/km.

10. The mode-locked fiber laser of claim 1, wherein the fiber-based gain medium has a normal (positive) dispersion, the mode-locked fiber laser further comprising a dispersion-compensation device having an anomalous (negative) dispersion to compensate the normal dispersion of the fiber-based medium, wherein the fiber-based gain medium and the dispersion-compensation device produce a net anomalous dispersion for the laser cavity.

11. The mode-locked fiber laser of claim 10, wherein the ratio of the anomalous dispersion to the normal dispersion is between two and five.

12. The mode-locked fiber laser of claim 10, wherein the dispersion-compensation device comprises a single-mode fiber having an anomalous dispersion.

13. The mode-locked fiber laser of claim 12, wherein the length ratio of the single-mode fiber to the fiber-based gain medium is from one to three.

14. The mode-locked fiber laser of claim 1, wherein the output laser pulses have pulse widths less than 200 femtosecond and an average power between 0.5 mW and 10 mW, and wherein the repetition rate is above 10 MHz.

15. The mode-locked fiber laser of claim 1, wherein the input coupler, the fiber-based gain medium, the first fiber-based polarization controller, the polarization isolator, the second fiber-based polarization controller, and the output coupler in part form a ring-shaped laser cavity.

16. The mode-locked fiber laser of claim 1, wherein the output coupler is positioned between the first fiber-based polarization controller and the polarization isolator in the laser cavity.

17. The mode-locked fiber laser of claim 1, wherein the output coupler is positioned between the fiber-based gain medium and the first fiber-based polarization controller in the laser cavity.

18. The mode-locked fiber laser of claim 1, wherein the output laser pulses have a Gaussian pulse shape, a soliton pulse shape, or a hyperbolic pulse shape.

19. The mode-locked fiber laser of claim 1, wherein the pump light has a different wavelength with the signal laser pulses.

20. The mode-locked fiber laser of claim 1, further comprising a fiber-based amplifier configured to amplify the output signal laser pulses to produce high power signal laser pulses having average power above 1 W.

21. The mode-locked fiber laser of claim 19, wherein the fiber-based amplifier is double cladding Ytterbium doped fiber.

22. A mode-locked fiber laser, comprising:
   an input coupler configured to couple pump light into a laser cavity;
   a fiber-based gain medium configured to amplify signal laser pulses in response to the pump light, wherein the signal laser pulses each has a peak portion having a peak polarization and a wing portion having a wing polarization different from the peak polarization;
   a first fiber-based polarization controller configured to align the peak polarizations of the signal laser pulses along a first polarization direction;
   a polarization isolator configured to uni-directionally pass the peak portions of the signal laser pulses having their peak polarizations aligned along the first polarization direction, wherein the polarization isolator is configured to block at least portions of the wing portions in the signal laser pulses;
   a second fiber-based polarization controller configured to control the peak polarization of the peak portions of the signal laser pulses received from the polarization isolator, wherein the polarization isolator is positioned between the first fiber-based polarization controller and the second fiber-based polarization controller, wherein the input coupler, the fiber-based gain medium, the first fiber-based polarization controller, the polarization isolator, and the second fiber-based polarization controller in part define the laser cavity;
   a photo detector configured to produce a detected signal in response to the signal laser pulses;
   a polarization-control driver comprising:
      a first circuit configured to produce a DC component and a periodic component at the repetition rate in response to the detected signal; and
      a second circuit configured to correlate the DC component and the periodic component to control at least one of the first fiber-based polarization controller or the second fiber-based polarization controller to produce mode-locking in the signal laser pulses; and
   an output coupler configured to direct portions of the signal laser pulses as output laser pulses out of the laser cavity, wherein the output laser pulses have pulse widths less than 200 femtosecond, an average power between 0.5 mW and 10 mW, and a repetition rate above 10 MHz.

23. The mode-locked fiber laser of claim 22, wherein the periodic component has a frequency in a range between 20 MHz to 100 MHz.

24. The mode-locked fiber laser of claim 22, wherein the first circuit is configured to produce a relaxation signal at a frequency in a range between 10 kHz and 500 KHz in response to the signal laser pulses, wherein second circuit is configured to correlate the relaxation signal to produce mode-locking in the signal laser pulses.

25. The mode-locked fiber laser of claim 22, wherein the polarization-control driver is configured to adjust the peak polarization of the signal laser pulses to produce mode locking in the signal laser pulses.

26. The mode-locked fiber laser of claim 22, wherein the polarization-control driver is configured to control the first fiber-based polarization controller to produce mode locking in the peak portions of the signal laser pulses in the laser cavity.

27. A method for generating laser pulses from a mode-locked fiber laser, comprising:
   coupling pump light into a laser cavity using an input coupler;
   amplifying signal laser pulses by a fiber-based gain medium in response to the pump light, wherein the signal laser pulses each has a peak portion having a peak polarization and a wing portion having a wing polarization different from the peak polarization;
   aligning the peak polarizations of the signal laser pulses along a first polarization direction by a first fiber-based polarization controller;
   uni-directionally passing the peak portions of the signal laser pulses having their peak polarizations aligned along the first polarization direction by a polarization isolator;
   blocking at least portions of the wing portions in the signal laser pulses by the polarization isolator;
   controlling the peak polarization of the signal laser pulses received from the polarization isolator by a second fiber-based polarization controller;
   producing a detected signal by a photo detector in response to the signal laser pulses;
   producing mode locking in the signal laser pulses at a repetition rate by controlling at least one of the first fiber-based polarization controller or the second fiber-based polarization controller by a polarization-control driver in response to the detected signal; and
   directing portions of the signal laser pulses as output laser pulses out of the laser cavity.

28. The method of claim 27, wherein the polarization-control circuit is configured to automatically produce mode locking in the signal laser pulses at the repetition rate in response to the detected signal.

29. The method of claim 27, wherein the input coupler, the fiber-based gain medium, the first fiber-based polarization controller, the polarization isolator, and the second fiber-based polarization controller in part define the laser cavity.

30. The method of claim 27, wherein the polarization isolator is positioned between the first fiber-based polarization controller and the second fiber-based polarization controller.

31. The method of claim 27, wherein the polarization-control driver is configured to produce a DC component and a periodic component at the repetition rate in response to the detected signal and to correlate the DC component and the periodic component to control at least one of the first fiber-based polarization controller or the second fiber-based polarization controller to produce mode-locking in the signal laser pulses.

32. The method of claim 27, wherein the polarization-control driver is configured to produce a relaxation signal at a frequency in a range between 10 kHz and 500 KHz in response to the signal laser pulses and to correlate the relaxation signal to produce mode-locking in the signal laser pulses.

33. The method of claim 27, wherein the polarization-control driver is configured to adjust the peak polarization of the peak portions of the signal laser pulses to produce mode locking in the output signal laser pulses.

34. The method of claim 27, wherein the polarization-control driver is configured to control the first fiber-based polarization controller to produce mode locking in the peak portions of the signal laser pulses in the laser cavity.

35. The method of claim 27, wherein the polarization isolator is fabricated with a single-model optical fiber.

36. The method of claim 27, wherein the fiber-based gain medium comprises a double-cladding Ytterbium or Erbium doped fiber.

37. The method of claim 27, wherein the fiber-based gain medium has a normal dispersion ranging from $-10$ ps/nm/km to $-80$ ps/nm/km.

38. The method of claim 27, wherein the fiber-based gain medium has a normal (positive) dispersion, the method further comprising:

compensating the normal dispersion of the fiber-based medium by a dispersion-compensation device having an anomalous (negative) dispersion to produce a net anomalous dispersion for the laser cavity.

39. The method of claim 27, wherein the output laser pulses have pulse widths equal or less than 200 femtosecond and an average power between 0.5 mW and 10 mW, and wherein the repetition rate is above 10 MHz.

* * * * *